United States Patent [19]

Sommer, Jr.

[11] 4,195,143

[45] Mar. 25, 1980

[54] RUBBER ARTICLES HAVING IMPROVED FATIGUE LIFE

[75] Inventor: John G. Sommer, Jr., Hudson, Ohio

[73] Assignee: The General Tire & Rubber Company, Akron, Ohio

[21] Appl. No.: 882,014

[22] Filed: Feb. 27, 1978

Related U.S. Application Data

[63] Continuation of Ser. No. 662,311, Mar. 1, 1976, abandoned, which is a continuation of Ser. No. 551,935, Feb. 24, 1975, abandoned, which is a continuation-in-part of Ser. No. 375,263, Jun. 29, 1973, Pat. No. 3,913,209, which is a continuation of Ser. No. 137,039, Apr. 23, 1971, abandoned.

[51] Int. Cl.² .................. C08D 9/00; C08D 13/28; C08C 17/28
[52] U.S. Cl. .......................... 525/354; 29/451; 260/775; 260/777; 260/784; 260/793; 525/343; 525/346; 525/349; 525/352
[58] Field of Search ............ 526/30, 35, 39; 260/775, 777, 784; 29/428, 434, 436

[56] References Cited

U.S. PATENT DOCUMENTS

| 538,147 | 4/1895 | Barus | 260/775 |
|---|---|---|---|
| 1152834 | 9/1915 | Price | 260/813 |
| 2,044,392 | 6/1936 | Lord | 29/436 |
| 2,383,734 | 8/1945 | Pfleumer | 260/775 |
| 2,397,774 | 4/1946 | Buckley | 260/79.5 |
| 2,417,093 | 3/1947 | Sparks | 526/39 |
| 2,446,621 | 8/1948 | Thiry | 29/436 |
| 2,461,953 | 2/1949 | Bargmeyer | 260/79.5 |
| 2,888,444 | 5/1959 | Roberts | 260/79.5 |
| 3,158,923 | 12/1964 | Reinsma | 29/436 |
| 3,373,132 | 3/1968 | Sutter | 260/33.6 |
| 3,562,303 | 2/1971 | Smith | 260/41.5 |

OTHER PUBLICATIONS

Materials & Compounding Ingredients for Rubber, Rubber World, (Bill Publ.), p. 423, (1968).

*Primary Examiner*—C. A. Henderson

[57] ABSTRACT

Disclosed is a sulfur-cured rubber article that has high resistance to reversion and low compression set which is post-modified to improve its fatigue life. The method involves introducing additional elemental sulfur in solution into the low sulfur-cured rubber article subsequent to curing.

1 Claim, No Drawings

RUBBER ARTICLES HAVING IMPROVED FATIGUE LIFE

CROSS REFERENCES TO RELATED APPLICATIONS

This application is a continuation of application Ser. No. 662,311, filed Mar. 1, 1976, now abandoned, which is a continuation of Ser. No. 551,935, filed Feb. 24, 1975, now abandoned, which is a continuation-in-part of Ser. No. 375,263, filed June 29, 1973, now U.S. Pat. No. 3,913,209, which is a continuation of Ser. No. 137,039, filed Apr. 23, 1971, now abandoned.

BACKGROUND OF THE INVENTION

This invention relates to the field of molded rubber articles. More particularly, this invention relates to the field of low sulfur-cured molded rubber articles and to methods of improving their fatigue life.

Natural and synthetic rubbers are compounded with various fillers, extenders and other ingredients and the resultant compound is formed under pressure into specific shapes after which it is cured or vulcanized under heat and pressure into a variety of articles (termed "vulcanizates"). Many of these vulcanizates are used in dynamic environments such as resilient (rubber) bushings that undergo the forces of compression, tension and torsion.

Most rubber articles are cured or vulcanized with a system that includes sulfur and an accelerator. The sulfur enters into the formation of crosslinks during curing. These crosslinks comprise two general types; monosulfide and disulfide crosslinks and polysulfide crosslinks. The literal differences between these are that the monosulfide and disulfide crosslinks consist of either one or two sulfur atoms connected between rubber hydrocarbon molecules; whereas a polysulfide linkage is any combination of three or more sulfur atoms joined together and connected between hydrocarbon rubber molecules. These two types of crosslinks impart various properties to the rubber matrix.

There are three properties of general interest with respect to the use of vulcanized rubber in resilient bushings. The first of these is reversion resistance. Reversion is the name given the depolymerization reaction that occurs in rubber both during and after vulcanization. During reversion the crosslinked rubber breaks down into smaller units and the physical properties of the vulcanizate suffer accordingly. Reversion is catalyzed by sulfur so that improved reversion resistance is associated with low-sulfur curing systems.

The second property is fatigue life or the ability of vulcanized rubber to withstand repeated flexing without significant failure of the crosslinked structure. This property is benefited by sulfur and is associated with high-sulfur curing systems.

The third property is compression set; this is the ability of the rubber to rebound to its original configuration after an applied force is removed from the article. Compression set is an inverse property of the sulfur content so that good (low) compression set is associated with low-sulfur curing systems.

These latter two properties are thought to be functions of the relative amount or density of mono- and disulfide linkages and polysulfide linkages. It is well-recognized that mono- and disulfide linkages are predominately produced in low-sulfur vulcanizing systems, i.e., less than about 1.5 phr sulfur, whereas in high-sulfur systems, i.e., about 2.0 phr sulfur and more, polysulfide linkages are produced in greater and greater amounts in lieu of the mono- and disulfide linkages.

One theory holds that mono- and disulfide linkages are relatively inflexible although strong and break down under repeated flexing whereas polysulfide linkages are more flexible although weaker but have the capability to reform to relieve the strain produced by the flexing. This would explain the enhancement of fatigue life in a higher sulfur content curing system. It would also explain why high sulfur content vulcanizates exhibit high (poor) compression set; the polysulfide linkages rearrange to relieve strain and thus have little driving force to further rearrange back to the original configuration when the forces are removed.

In certain rubber articles, such as in resilient bushings that comprise an annular rubber insert constrained under radial compression between inner and outer rigid sleeves, it is desired that the vulcanized rubber exhibit good reversion resistance and a good fatigue life. These properties ostensibly appear to be inapposite because, as explained above, reversion resistance is maximized at low sulfur levels whereas fatigue life is maximized at high sulfur levels.

Another aspect of these resilient bushings is that the time taken in vulcanizing the annular rubber insert is a significant cost factor. It is preferred to increase the vulcanization temperature to reduce the vulcanization time to reduce this cost. Such an increase in temperature would not only reduce vulcanization time but would allow the presently compression molded inserts to be injection molded and realize the additional cost savings associated with this high volume molding technique.

Unfortunately, increased vulcanization temperatures cause acceleration of the reversion reaction. At high levels of sulfur (to enhance fatigue life) the accelerated reaction may nullify all cost savings due to shorter vulcanization time whereas at low levels of sulfur (to enhance reversion resistance) fatigue life is seriously impaired.

This invention is based upon the discovery that a low sulfur-cured rubber article that has a normally high resistance to reversion, a low compression set, and poor fatigue life, may be treated subsequent to curing with additional elemental sulfur to significantly improve the fatigue life. Moreover, the sulfur treatment is confined to the surface of the vulcanizate so that other overall properties are not grossly effected.

Therefore, the main object of this invention is a method of treating a low-sulfur cured molded rubber article that normally has good compression set and good reversion resistance to generally improve its fatigue life. Other objects of this invention include a method of improving the fatigue life of low sulfur-cured rubber articles; a method of producing an improved molded part for use under dynamic conditions through the use of bi-level addition of sulfur, a process of potentially reducing manufacturing costs, a process that is simple and easy to practice and that is amenable to automatic and semiautomatic process control.

SUMMARY OF THE INVENTION

This invention concerns sulfur cured rubber articles having improved fatigue life and a method of improving the fatigue life of such sulfur-cured rubber articles comprising curing the rubber with a curing system containing sulfur in an amount that leads to preferential formation of monosulfide and disulfide linkages and thereafter introducing additional sulfur into the cured rubber.

DESCRIPTION OF THE PREFERRED EMBODIMENT

This invention is applicable to natural rubber as well as all other sulfur-curable synthetic rubbers. Examples of these sulfur-curable synthetic rubbers include butadiene-styrene rubber, polychloroprene, isobutylene-isoprene rubber, isoprene and butadiene rubbers, nitrile-butadiene rubber, ethylene-propylene-diene terpolymer rubber and polyurethane rubbers.

This invention is concerned with sulfur-containing curing systems. Sulfur-containing curing systems generally comprise elemental sulfur and/or elemental sulfur in combination with other sulfur-containing materials and an accelerator. Examples of sulfur curatives include sulfur dichloride, pure sulfur in combination with magnesium carbonate, sulfur monochloride, refined natural sulfur, aliphatic polysulfide polymers, alkyl-phenol-disulfides, etc. Examples of accelerators used in conjunction with the sulfur curatives include formaldehyde-para-toluidine, diaryl guanidine, piperidinium pentamethylene dithiocarbamate, tetramethyl-thiuram disulfide, tetramethyl-thiuram monosulfide, zinc diethyl dithiocarbamate, butyraldehyde butyl amine, and zinc dibutyl dithiocarbamate.

The curing system in this invention is added to the extent that it causes vulcanization of the rubber with preferential formation of monosulfide and disulfide linkages and thereafter introducing additional sulfur into the cured rubber to improve fatigue life; this is thought to be done by forming polysulfide linkages. The manner in which the curing is controlled to lead to preferential formation of monosulfide and disulfide linkages is to utilize a sulfur-accelerator curing system wherein the sulfur is in the amount of between about 0.5 to about 1.5 phr.

Analyses have shown that where the curing system contains sulfur in the amount greater than about 1.5 phr the sulfide cross-linkages begin to include a significant number of polysulfide linkages causing the rubber to have high compression set and tendency to experience reversion. In contrast, when the curing system contains less than about 0.5 phr sulfur, the amount of accelerator required for vulcanization becomes inordinate, i.e. upwards of 10 phr.

Therefore, to cure the rubber such as to preferentially form monosulfide and disulfide linkages, it is necessary that the curing system contain between about 0.5 and about 1.5 phr sulfur. Such a range of sulfur content in the curing system is known in the art as a "low sulfur" curing system and will be described by such term throughout this description. In this respect, virtually any curing system containing sulfur in the aforedescribed amount is operable and will perform the curing pursuant to the teaching of this invention. Such a curing system will generally cause adequate vulcanization of the rubber when using suitable temperature and time condition.

As the curing conditions suitable for the various sulfur-containing curing systems vary with the type of rubber, the size of the article, and the particular curing system, this choice is fully within the ambit of one skilled in the rubber art.

Once the rubber article is cured with the aforedescribed curing system, it will exhibit an excellent low compression set and high reversion resistance; however, it will have poor fatigue life. As described hereinabove, it is theorized that the reason for the poor fatigue life is the lack of polysulfide linkages between the cross-linked hydrocarbon molecules. The mono- and disulfide linkages that break under stress resist reformation and contribute to failure of the stressed article. Therefore, the next step in the practice of this invention is to introduce additional sulfur in elemental form into the cured rubber article to improve its fatigue life by providing a reservoir of elemental sulfur molecules within the matrix of the rubber from which new polysulfide linkages may form as the rubber is flexed during its use.

The most preferred method of introducing additional sulfur into the cured rubber is to immerse the rubber in a liquid solution of elemental sulfur dissolved into a suitable solvent such as carbon disulfide or benzene. By "suitable" is meant a solvent that will dissolve sulfur and that will swell the rubber. Upon immersion, the rubber will also swell and absorb the dissolved elemental sulfur molecules into the matrix. As the examples hereinafter will show, this method of introducing additional sulfur is time dependent, i.e., the amount of sulfur ultimately absorbed (introduced) into the rubber is a function of the time in which the article is immersed.

After the swollen article is removed from the solution, the volatile constituents are driven off, such as by vacuum drying, oven drying, or other process. The free elemental sulfur thus inherently introduced in molecular size within the rubber matrix appears to enter into combination with the mono- and disulfide linkages that are cleaved or broken during the time when the rubber subsequently is placed under a strain as during fatigue testing, for example. From the significant increase in fatigue life of the cured rubber it appears that such elemental sulfur converts the monosulfide and disulfide linkages near the surface of the article into polysulfide linkages which apparently rearrange and reform under subsequent dynamic strain and thus increase fatigue life.

Although applied dynamic forces are transmitted substantially throughout the rubber matrix, damage from fatigue is first observed as cracks and pits on the surface, especially on surfaces (interfaces) that are in contact with rigid members such as in the aforementioned resilient bushing. A unique feature of this invention is that, in almost all of the methods disclosed herein, sulfur is added at or near the surface of the rubber. In this way, it is added at the exact place where it accomplishes the most good. By providing the reservoir of free sulfur from which the cleaved mono- and disulfide linkages may convert into polysulfide linkages at the surface, crack propogation is substantially reduced while the body of the rubber article tends to retain its crosslinked density so that it retains its desirable overall low compression set.

The novel aspects of this invention, i.e. the significant increase in fatigue life without an excessive increase in compression set is especially beneficial with respect to resilient rubber bushings. Many resilient rubber bushings are of the type wherein a cured annular rubber insert is constrained under radial compression between an inner and outer rigid sleeve. Generally speaking, the rubber insert is formed, i.e. compression molded, transfer molded, injection molded, etc., and cured at high (280° F.–380° F.) temperature. It is thereafter pressed into the outer sleeve of the bushing. Next, a mandrel carrying the inner sleeve is forced through a hole in the center of the insert. As the mandrel is forced through the insert (termed "shooting" in the trade parlance), the rubber is subjected to a high compression force in the radial direction so that the walls of the insert become thinner and its length becomes longer.

Such a bushing is clearly shown in the U.S. Pat. No. 2,572,215. Such a bushing as disclosed is exemplary of many variations wherein an annular rubber insert is mounted in radially compressed relation between a cylindrical inner member and a cylindrical outer member and wherein a substantially improved fatigue life of the rubber insert would be highly beneficial to the user of such a bushing.

When practicing this invention on a bushing of this type, the bushing may first be constructed and thereafter processed to introduce additional sulfur into the rubber by dipping the whole bushing in a liquid solution of elemental sulfur dissolved into carbon disulfide or benzene, for example. In addition, the rubber insert may be treated with additional sulfur dissolved into solution as aforementioned prior to assembling the bushing.

With respect to these resilient bushings, it has been found that fatigue cracking of the bushing is generally confined to the interface between the rubber insert and the rigid sleeve. In the aforedescribed method of introducing additional sulfur into the cured rubber, it should be noted that the introduction of sulfur would start at the surface of the rubber; hence, the sulfur is added precisely where it is the most beneficial, i.e. along the interfaces of the rubber insert.

The following example is given to show one skilled in the art how to practice this invention as well as to show some of the beneficial aspects thereof and some of the parameters involved in the methods. Unless otherwise noted, all parts are parts by weight per 100 parts of hydrocarbon rubber (phr) and all percentages are percent by weight.

EXAMPLE

Two rubbery polymers A and B were prepared according to the recipes shown below in Table 1. These polymers are standard rubbery polymers for use in resilient bushings. The constituents of each compound were thoroughly blended in a suitable mixing device, such as a Banbury mixer. Each compound was then charged to a transfer mold to form annular rubber inserts. The inserts were cured in the mold at a temperature of 320° F. for twelve minutes and were thereafter removed from the mold. Each annular insert was molded to a length of 1.02 inches, to an outer diameter of 1.24 inches, to a bore (center passageway) of 0.53 inches, and to a 1.36 inch diameter flange at one end.

Four inserts of each of Compounds A and B were immersed in a solution of carbon disulfide saturated with sulfur for a period of 30 minutes at room temperature. Another four inserts from each group were immersed for 60 minutes in the same solution. After removal from the solution, the inserts were dried by vacuum at room temperature. Four inserts from each group remained untreated.

All of the inserts were then assembled between pairs of annular metal sleeves to form bushings. The radial spacing between the sleeves in each case was 0.156 inch as opposed to the initial thickness of the rubber in the insert which was 0.350 inch. The resultant compression of the rubber between the sleeves caused the rubber insert to become axially extended to a length of about 1.625 inches.

The bushings were then subjected to a standard bushing fatigue life test in a fatigue testing machine. In this test, one sleeve is secured against rotation while the other sleeve is rotated through a total arc of 58° at a speed of about 240 cycles per minute. A load of 470 pounds is applied radially to the bushing during the test. The test is run until failure of the bushing occurs. Below in Table 2 is shown the average weight gain of the elemental sulfur in the bushing following the immersion in the solution of sulfur and carbon disulfide and also the fatigue life of the bushing (shown in thousands of cycles).

All of the bushings failed at the interface between the rubber insert and the inner metal sleeve.

TABLE 1

| Ingredients | A | | B | |
|---|---|---|---|---|
| Natural Rubber | 100.00 | parts | 100.00 | parts |
| Carbon Black | 39 | parts | 39 | parts |
| Zinc Oxide | 3 | parts | 3 | parts |
| Fatty Acid | 1.5 | parts | 1.5 | parts |
| Retarder | 0.8 | parts | 0.8 | parts |
| Antioxidant | 1.0 | parts | 1.0 | parts |
| Accelerator | 2.0 | parts | 1.1 | parts |
| Sulfur | 1.0 | parts | 2.8 | parts |

TABLE 2

| | A | | B | |
|---|---|---|---|---|
| Immersion Time (minutes) | Weight Gain % | Cycles to Failure (Thousands) | Weight Gain % | Cycles to Failure (Thousands) |
| 0 | 0 | 88 | 0 | 151 |
| 30 | 3.2 | 193 | 2.7 | 183 |
| 60 | 5.6 | 423 | 3.8 | 129 |

The tabulations in Table 2 readily show the increase in fatigue life (cycles to failure) of the low-sulfur cured inserts as they were treated with more and more elemental sulfur, from 88 to 193 to 423.

Note also that this enhancement did not occur as significantly in the high sulfur cured inserts, from 151 to 183 to 129.

To express the amount of elemental sulfur physically disposed within the matrix of the vulcanized rubber in the terms of phr as expressed in Table 1 rather than in terms of Weight Gain % as expressed in Table 2, it is considered that the post-added elemental sulfur should be in the range of about 0.5 phr to about 15 phr and preferably in the range of about 1 phr to about 10 phr.

An excess of post-added elemental sulfur is not considered to be detrimental though it would not be effective. In quantity production of such bushings or rubber articles a minimum immersion time in the solvent-sulfur solution will likely be desirable.

The foregoing description will suggest other variations to those skilled in the art, all of which are intended to be included in the spirit of the invention as herein set forth.

What is claimed is:

1. In an improved resilient bushing having an annular molded vulcanized rubber insert in radially compressed relation between a cylindrical inner member and a cylindrical outer member, said improved bushing having initially low compression set, initially good reversion resistance and substantially improved fatigue life wherein said molded rubber insert comprises is a molded rubber compound vulcanized with from between 0.5 phr and 1.5 phr of sulfur the improvement characterized by the inclusion of from 0.5 phr to 15 phr of post vulcanization added elemental sulfur distributed within the matrix of the vulcanized rubber compound, with no further vulcanization step employed in the manufacture after the addition of the post vulcanization added elemental sulfur.

* * * * *